United States Patent [19]
Brogan

[11] 3,923,323
[45] Dec. 2, 1975

[54] TUBE FITTING

[75] Inventor: Patrick J. Brogan, Sleepy Hollow, Ill.

[73] Assignee: Imperial-Eastman Corporation, Chicago, Ill.

[22] Filed: Jan. 2, 1974

[21] Appl. No.: 430,173

[52] U.S. Cl. ............ 285/3; 285/331; 285/341; 285/334.2; 285/382.7
[51] Int. Cl.² .................. F16L 17/02; F16L 37/08
[58] Field of Search ......... 285/3, 4, 331, 341, 370, 285/371, 397, 398

[56] References Cited
UNITED STATES PATENTS

| | | | |
|---|---|---|---|
| 240,818 | 5/1881 | Duvall | 285/397 X |
| 762,807 | 6/1904 | Cruise | 285/397 X |
| 1,891,424 | 12/1932 | Kirkpatrick | 285/370 X |
| 2,182,811 | 12/1939 | Kocher | 285/3 |
| 2,935,339 | 3/1960 | Frederick | 285/4 |
| 3,025,084 | 3/1962 | Franck | 285/3 X |
| 3,139,293 | 6/1964 | Franck | 285/4 |
| 3,290,062 | 12/1966 | Ziherl et al. | 285/3 |

*Primary Examiner*—Werner H. Schroeder
*Assistant Examiner*—Wayne L. Shedd
*Attorney, Agent, or Firm*—Hofgren, Wegner, Allen, Stellman & McCord

[57] ABSTRACT

A tube fitting having a recess in the body bore for receiving the distal end of a tube to be coupled inwardly of a constrictible sleeve adapted to be constricted about the tube end as the result of threaded movement between a nut and the body portion of the fitting in the make-up thereof. The recess defines structure for supporting and centering the tube end during the make-up of the fitting to provide an improved sealed connection.

10 Claims, 4 Drawing Figures

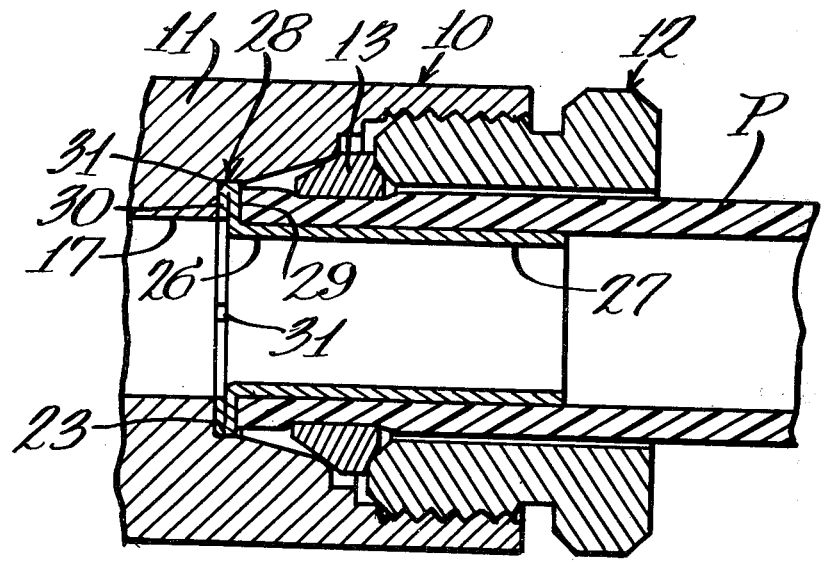

TUBE FITTING

BACKGROUND OF THE INVENTION

1. Field of the Invention

This invention relates to tube fittings, and in particular to constrictible sleeve tube fittings.

2. Description of the Prior Art

One improved form of tube fitting utilizing a one-piece nut and sleeve element is shown in U.S. letters Pat. No. 3,139,293 of George E. Frank owned by the assignee hereof. In the disclosed fitting, the sleeve is carried on the inner end of the nut by a frangible connection which, during the make-up of the fitting, breaks to permit the sleeve to be permanently assembled to the tube end and define the means for sealing the tube end to the fitting body.

In the conventional fitting of this type, the tube end is urged against a frustoconical, tapered surface which limits the inward movement of the tube end and which serves as a line contact means for supporting the tube end. Such fittings have conventionally been employed in applications where relatively low vibration and pressure conditions obtain. The inability of the fitting to withstand greater vibration amplitudes and higher pressures has been limited by the relatively small support of the tube provided by the line contact thereof.

A number of prior art tube fittings have been developed utilizing sealing means separate from the nut wherein the inner end of the tube is received in a recess. Illustratively, in U.S. letters Pat. No. 2,470,546 of Bert G. Carlson, a tube securing means is disclosed utilizing a resilient seal element received in a cylindrical portion of the bore, with the tube end being received in a smaller diameter cylindrical portion of the bore.

In James C. Richardson U.S. letters Patent No. 2,553,981, a self-upsetting coupling is disclosed wherein the separable sleeve is received in a tapered portion of the bore outwardly of a planar radial shoulder adapted to be abutted by a crimped portion of a tube in the made-up condition of the fitting.

In a number of prior art patents owned by the assignee hereof, different forms of tube couplings utilizing tube receiving recesses are disclosed. Thus, in U.S. letters Patent No. 2,350,017 of Ernest W. Davis, a tube coupling is shown having a sleeve threadedly connected to the nut and a recess at the inner end of the body bore for receiving the tube end.

In U.S. letters Patent No. 2,447,060 of George E. Franck, a high pressure coupling is shown having a cylindrical portoin at the inner end of the tube receiving bore.

In George E. Franck U.S. letters Patent No. 3,025,084, a frangible connection is provided between the sleeve and nut and the body bore is provided with a frustoconical tube receiving surface extending to a radial shoulder providing a limit to the insertion of the tube.

In George E. Franck U.S. letters Patent No. 3,139,293, a frangibly connected sleeve is provided in combination with a body bore having a stepped frustoconical inner recess.

SUMMARY OF THE INVENTION

The present invention comprehends an improved tube fitting providing an improved vibration-resistant, high pressure connection with both metal and plastic tubes.

The invention comprehends providing such a tube fitting with a support portion at the inner end of the tube providing improved centering and support of the tube during make-up of the fitting, improved vibration resistance in the use thereof, and improved pressure handling ability in the use thereof.

More specifically, the invention comprehends the provision in a tube fitting having a body provided with a through bore, and a one-piece element defining a frangibly connected nut and sleeve, the element being provided with a through bore adapted to receive coaxially the end of a tube to be connected to the fitting with the distal end of the tube projecting from the sleeve, the body bore defining a right cylindrical inner recess adapted to receive coaxially the projecting distal end of the tube for supporting and centering the tube end during make-up of the fitting, the body bore further defining a camming portion outwardly of the inner recess and tapering into said recess for causing constrictive mounting of the element sleeve to the supported and centered tube end and separation of the element sleeve from the element nut during the make-up of the fitting.

Where the tube to be coupled comprises a synthetic resin tube, the fitting may further include a tubular insert adapted to be received in the end of the tube and having an outturned distal flange abutting the distal end of the tube. The outturned flange of the insert is received in the body recess to provide improved support and centering of the tube end during the make-up of the fitting and the insert further supports the flexible tube against the constrictive action of the sleeve and permits the tube end to be clamped thereto as a result of the sleeve construction in the make-up of the fitting.

The recess may define a planar radial shoulder at the inner end thereof for limiting the insertion of the tube end. Where the insert is utilized, the insert flange abuts the shoulder to provide such insertion limitation.

The sleeve is arranged to constrict the tube axially outwardly of the body recess.

The insert flange may comprise a doubled flange having an inturned distal end. In the illustrated embodiment, the insert flange is discontinuous so as to be radially constrictible to be in compressed, frictional engagement with the cylindrical wall of the recess while yet permitting facilitated withdrawal of the tube end with the insert maintained therein during a subsequent disassembly of the connection. In the illustrated embodiment, the flange has an axial thickness of approximately one-half the axial length of the cylindrical recess.

The tube fitting of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective exploded view of a tube fitting embodying the invention;

FIG. 2 is a fragmentary diametric section thereof as at the beginning of the make-up of the fitting;

FIG. 3 is a diametric section similar to that of FIG. 2, but as upon completion of the make-up of the fitting; and FIG. 4 is a diametric section similar to that of FIG. 3, but illustrating a modified form of tube fitting embodying the invention adapted for use with a synthetic resin tube.

DESCRIPTION OF THE PREFERRED EMBODIMENT

In the exemplary embodiment of the invention as disclosed in the drawing, a tube fitting generally designated 10 is shown to comprise a body 11 and an element 12 including a sleeve 13 and a nut 14 coaxially connected by a frangible connection 15. The fitting is adapted to have a tube end T sealingly connected thereto with the tube end extending through a through bore 16 of the nut and into the outer end of a through bore 17 of the body. In the make-up of the fitting, frangible connection 15 is broken to permit sleeve 13 to remain permanently installed on the tube end while further permitting disassembly of the fitting by movement of element 12 and the tube end axially outwardly from the body member 11.

As seen in FIG. 3, body bore 17 includes an outer, internally threaded portion 18 engaged by a threaded portion 19 of the nut 14. Bore 17 further includes a frustoconical camming surface 20 axially inwardly of threaded portion 18 and spaced therefrom by a cylindrical portion 21. The outer edge portion 22 of camming surface 20 is preferably rounded so as to deflect sleeve 13 radially inwardly as element 12 is moved into the body bore during make-up of the fitting. The invention further comprehends providing a cylindrical inner recess 23 at the inner end of camming surface 20 adapted to receive the distal end 24 of tube end T for supporting and centering the tube end during make-up of the fitting. Cylindrical recess 23 preferably has a substantial axial length so as to support the distal end 24 of the tube end over a substantial length and effectively prevent deflection of the tube end during make-up of the fitting. The cylindrical recess 23 further serves as a guide for the tube end 24 preventing cocking of the tube end relative to the axis of the fitting and thereby ensuring an improved leakproof seal between the tube T, sleeve 13, and body 11.

The diameter of recess 23 is preselected to provide a radial clearance between the distal tube portion 24 and the side wall of the recess which, in the illustrated embodiment, is in the order of approximately 0.004 inch to 0.006 inch.

The inner end of recess 23 is defined by a planar radial shoulder 25 which serves as a positive tube stop limiting the insertion of tube end T.

As shown in FIG. 3, sleeve 13 is urged into the wall of tube end T so as to effectively constrict the tube in providing the effectively positive sealed connection thereof to body 11. The construction of the tube is spaced outwardly from recess 23 so that the distal end 24 of the tube effectively remains undeformed within the supporting recess 23. The improved guiding and centering action of recess 23 permits substantial cocking forces to be generated as during the breaking of the frangible connection 15 while maintaining the tube end substantially coaxially aligned with the fitting so as to provide the desired improved sealed connection.

The invention further comprehends the use of the fitting with a tube end P formed of a synthetic resin, or plastic. As shown in FIG. 4, fitting 10 may further include a tubular insert generally designated 26 for use with such plastic tubing and providing a desirable vibration-resistant high pressure connection.

As shown, insert 26 includes a tubular outer portion 27 and an outturned flange 28 at the distal inner end. Flange 28 includes an outer, outturned portion 29 and an inner inturned distal portion 30. The axial thickness of flange 28 in the illustrated embodiment is substantially greater than one-half the axial length of recess 23. The flange comprises an annular flange provided with a plurality of slits 31 permitting the flange to be constricted radially by frictional engagement with the cylindrical side wall of recess 23, thereby to provide an improved retention of the flange in the recess. While the flange is radially compressed, the flange has sufficient yieldability to permit withdrawal of the insert together with the tube end P without the need for excessive force in effecting such withdrawal during disassembly of the fitting.

As shown in FIG. 4, sleeve 13 compresses the tube inwardly against the tubular portion 27 of insert 26 so as to clamp the tube firmly to the insert axially outwardly of the recess 23.

The use of fitting 10 is extremely simple. Where the tube T is formed of metal, the user need merely insert the tube end through element 12 into bore 17 of body 11 until the distal end 24 of the tube end abuts recess shoulder 25. Element 12 is then advanced along the tube to engage threaded portion 19 thereof with the threaded bore portion 18 of the body. Forceful rotation of nut portion 14 of element 12 urges the sleeve portion 13 into constrictive retention with the tube end, as shown in FIG. 3. During this operation, the tube end is held accurately coaxially relative to the body and nut by the cylindrical recess wall, assuring an improved sealed connection between the tube and fitting. As the tube end 24 is effectively supported inwardly of sleeve 13, an improved vibration-resistant connection is obtained. As the tubing is maintained accurately coaxial to the fitting during the assembly, high pressure handling capabilities are further obtained.

When it is desired to disassemble the fitting, the user unthreads nut portion 14 from the body. Frangible connection 15 having been broken during assembly of the fitting, nut portion 14 may move away from sleeve portion 13 for facilitated withdrawal from the body and permitting subsequent axial withdrawal of the tube end with the sleeve end 13 secured thereto from the body bore.

Where the tube comprises a plastic tube, as shown in FIG. 4, the same operations are performed with the exception of firstly installing the tubular insert 26 in the tube end prior to the insertion of the tube end through the element 12 into body bore 17. As discussed above, tubular insert 26 is effectively retained in association with the tube end by the constrictive deformation of sleeve 13 in the make-up of the fitting so that in disassembly of the connection, the tubular insert moves outwardly from recess 23 with the tube end.

The foregoing disclosure of specific embodiments is illustrative of the broad inventive concepts comprehended by the invention.

I claim:

1. In a tube fitting having a body provided with a through bore, and a one-piece element defining a frangibly connected nut and sleeve, said element being provided with a through bore adapted to receive coaxially the end of a tube to be connected to the fitting with the distal end of the tube projecting from the sleeve, said body bore defining a right cylindrical inner recess adapted to receive coaxially the projecting distal end of the tube for supporting and centering the tube end during make-up of the fitting, said recess having an outer diameter preselected to be slightly larger than the outside diameter of said distal end of the tube for facilitated insertion of said distal end of the tube thereinto during said make-up of the fitting, and having an inner diameter substantially equal to the inner diameter of said distal end of the tube, the inner end of said recess being defined by a radial, planar surface defining means for effectively positively fixing said distal end of the tube against longitudinal inward movement from a preselected inserted position in the body bore, said sleeve having a longitudinally inner nose portion defined by a radial inner end surface and a frustoconical outwardly widening surface, said sleeve further having a longitudinally outer portion defined by a radial outer end surface, a frustoconical outwardly narrowing surface, and a radial, annular surface at the inner, wide end of said outwardly narrowing surface, said body bore further defining a camming portion outwardly of said inner recess and tapering into said recess for causing constrictive mounting of said element sleeve to the supported, centered, and longitudinally fixed tube end and separation of said element sleeve from said element nut during said make-up of the fitting, said sleeve being frangibly connected to said nut at said outwardly narrowing surface, said nut having a longitudinally inner portion defining a longitudinally outer, outwardly narrowing frustoconical surface and a longitudinally inner radial stop surface, said radial annular surface of said sleeve abutting said radial stop surface of said nut in the made-up arrangement of the fitting to provide a preselected constriction of the longitudinally outer portion of the sleeve by engagement of said nut inner portion with said sleeve outer portion frustoconical surface, said sleeve inner end surface having an unconstricted outside diameter substantially larger than the diameter of said body bore recess.

2. The tube fitting structure of claim 1 wherein the recess has a radius preselected to be in the range of approximately 0.004 inch to 0.006 inch smaller than the outer radius of the distal end of the tube.

3. In a tube fitting having a body provided with a through bore, a one-piece element defining a frangibly connected nut and sleeve, said element being provided with a through bore adapted to receive coaxially the end of a synthetic resin tube to be connected to the fitting with the distal end of the tube projecting from the sleeve, a tubular insert adapted to be received in the end of the tube and having an outturned, radially constrictible, distal flange abutting said distal end of the tube, said body bore defining a right cylindrical inner recess receiving coaxially compressively said outturned flange of the insert for supporting and centering the tube end during make-up of the fitting, the inner end of said recess and said flange being defined by facially abutting radial, planar surfaces, said body bore further defining a camming portion outwardly of said inner recess for causing constrictive mounting of said element sleeve to the supported, centered, and longitudinally fixed tube end and clamping of said tube end to the inserted tubular insert, said nut and sleeve defining cooperating means for providing a preselected limited constriction of said element sleeve into the wall of said tube end upon separation of the sleeve from said element nut during said make-up of the fitting, said sleeve having a longitudinally inner nose portion defined by a radial inner end surface and a frustoconical outwardly widening surface, said sleeve further having a longitudinally outer portion defined by a radial outer end surface, a frustoconical outwardly narrowing surface, and a radial, annular surface at the inner, wide end of said outwardly narrowing surface, said sleeve being frangibly connected to said nut at said outwardly narrowing surface, said nut having a longitudinally inner portion defining a longitudinally outer, outwardly narrowing frustoconical surface and a longitudinally inner radial stop surface, said radial annular surface of said sleeve abutting said radial stop surface of said nut in the made-up arrangement of the fitting to provide a preselected constriction of the longitudinally outer portion of the sleeve by engagement of said nut inner portion with said sleeve outer portion frustoconical surface, said sleeve inner end surface having an unconstricted outside diameter substantially larger than the diameter of said body bore recess.

4. The tube fitting structure of claim 3 wherein said insert is formed of metal.

5. The tube fitting structure of claim 3 wherein said flange includes an outturned axially outer portion and an inturned distal inner end portion defining said planar surface thereof.

6. The tube fitting structure of claim 3 wherein said insert slidably radially engages said body in said recess.

7. The tube fitting structure of claim 3 wherein said flange comprises a discontinuous annular flange.

8. The tube fitting structure of claim 3 wherein said flange comprises an annular flange having a plurality of circumferentially spaced slits.

9. The tube fitting structure of claim 3 wherein said flange has an axial thickness of over approximately one-half the axial length of said recess.

10. The tube fitting structure of claim 3 wherein said sleeve is arranged to engage said camming portion of the body bore at a position spaced substantially inwardly from said recess whereby said distal end of the tube is substantially unconstricted in the made-up arrangement of the fitting.

* * * * *